United States Patent
Maekawa

(10) Patent No.: US 10,941,044 B2
(45) Date of Patent: Mar. 9, 2021

(54) METHOD OF PRODUCING ZEOLITE FILM

(71) Applicant: MITSUI E&S MACHINERY CO., LTD., Tokyo (JP)

(72) Inventor: Kazuya Maekawa, Tokyo (JP)

(73) Assignee: MITSUI E&S MACHINERY CO., LTD., Tokyo (JP)

(*) Notice: Subject to any disclaimer, the term of this patent is extended or adjusted under 35 U.S.C. 154(b) by 0 days.

(21) Appl. No.: 16/762,921

(22) PCT Filed: Jul. 29, 2019

(86) PCT No.: PCT/JP2019/029593
§ 371 (c)(1),
(2) Date: May 9, 2020

(87) PCT Pub. No.: WO2020/255933
PCT Pub. Date: Nov. 12, 2020

(65) Prior Publication Data
US 2020/0392006 A1 Dec. 17, 2020

(30) Foreign Application Priority Data
May 9, 2019 (JP) .................................. 2019-089195

(51) Int. Cl.
*B01J 37/10* (2006.01)
*B01D 71/02* (2006.01)
(Continued)

(52) U.S. Cl.
CPC ............... *C01B 39/02* (2013.01); *B01J 29/06* (2013.01); *B01J 35/04* (2013.01); *B01J 37/0209* (2013.01); *B01J 37/10* (2013.01); *B01D 71/028* (2013.01)

(58) Field of Classification Search
CPC .. C01B 39/02; B01J 29/06; B01J 35/04; B01J 37/0209; B01J 37/10; B01D 71/028
See application file for complete search history.

(56) References Cited

U.S. PATENT DOCUMENTS

2015/0321151 A1* 11/2015 Lee .................... B01D 71/56
210/500.38

FOREIGN PATENT DOCUMENTS

| JP | 2004099338 A | 4/2004 |
| JP | 2008285365 A | 11/2008 |

(Continued)

OTHER PUBLICATIONS

Pera-Titus et al, "Preparation of inner-side tubular zeolite NaA membranes in a continuous flow system", Separation and Purification Technology vol. 59, Issue 2, Feb. 15, 2008, pp. 141-150 (Year: 2008).*

(Continued)

*Primary Examiner* — David M Brunsman
(74) *Attorney, Agent, or Firm* — Juan Carlos A. Marquez; Marquez IP Law Office, PLLC

(57) ABSTRACT

Provided is a method of producing a zeolite film continuously and efficiently. The method of forming zeolite on a surface of a support is characterized in that the method includes: a first step of attaching zeolite fine crystals to a surface of a support; a second step of preparing synthetic gel for growing the fine crystals; a third step of putting the support and the synthetic gel into a continuous reactor and performing hydrothermal synthesis; and a fourth step of cleaning the support on which zeolite has been hydrothermally synthesized, and in the third step, the temperature, pressure, and flow of the synthetic gel in the continuous reactor is adjusted, the support is moved being immersed in the synthetic gel, the reaction time of the hydrothermal synthesis is adjusted by adjusting the time from when the support enters the continuous reactor to when the support exits the continuous reactor.

4 Claims, 3 Drawing Sheets

(51) Int. Cl.
*C01B 39/02* (2006.01)
*B01J 29/06* (2006.01)
*B01J 35/04* (2006.01)
*B01J 37/02* (2006.01)

(56) References Cited

FOREIGN PATENT DOCUMENTS

| | | | |
|---|---|---|---|
| JP | 2010017606 A | | 1/2010 |
| JP | 2010058015 A | | 3/2010 |
| JP | 2010131600 A | * | 6/2010 |
| JP | 2010131600 A | | 6/2010 |
| JP | 2018167267 A | | 11/2018 |

OTHER PUBLICATIONS

Huang et al, "Synthesis and properties of A-type zeolite membranes by secondary growth method with vacuum seeding", Journal of Membrane Science vol. 245, Issues 1-2, Dec. 1, 2004, pp. 41-51 (Year: 2004).*

Pera-Titus, "Preparation of inner-side tubular zeolite NaA membranes in a semi-continuous synthesis system", Journal of Membrane Science vol. 278, Issues 1-2, Jul. 5, 2006, pp. 401-409 (Year: 2006).*

* cited by examiner

METHOD OF PRODUCING ZEOLITE FILM

TECHNICAL FIELD

The present invention relates to methods of continuously producing zeolite films industrially.

This application is a 371 filing of PCT/JP2019/029593, filed Jul. 29, 2019.

BACKGROUND ART

The use of zeolite films for processes for separating and concentrating liquid mixture or gaseous mixture has been increased in commercial plants in recent years. In general, a zeolite film for separation and concentration is synthesized on a surface of a porous support, and it is used integrally with the support. Such zeolite films have been produced in a batch production method also industrially in which seed crystals are attached to a surface of a support, and the support is immersed in aqueous gel and subjected to hydrothermal synthesis (see, for example, patent document 1). Thus, the production method has a problem that the process of producing zeolite films requires manpower, leading to a high production cost. A method of continuously producing zeolite films in automatic operation has not been established yet.

To industrially produce zeolite films the demand for which is increasing more and more toward the future, a method is desired that is capable of stably producing high-quality zeolite films efficiently without using manpower.

PRIOR ART DOCUMENT

Patent Document

Patent Document 1: Japanese patent application Kokai publication No. 2010-131600

SUMMARY OF THE INVENTION

Problem to be Solved by the Invention

An object of the present invention is to provide a method of continuously producing zeolite films efficiently.

Means for Solving the Problem

A method of producing a zeolite film according to the present invention to achieve the above object is a method of producing a zeolite film by forming zeolite on a surface of a support, characterized in that the method comprises the following first to fourth steps:

a first step of attaching zeolite fine crystals to a surface of a support;

a second step of preparing synthetic gel for growing the fine crystals;

a third step of putting the synthetic gel into a continuous reactor and performing hydrothermal synthesis of the zeolite on the surface of the support while moving the support in the continuous reactor; and a fourth step of cleaning the support subjected to the hydrothermal synthesis, and in the third step, the temperature, pressure, and flow of the synthetic gel in the continuous reactor is adjusted, the support is moved being immersed in the synthetic gel, the reaction time of the hydrothermal synthesis is adjusted by adjusting the time from when the support enters the continuous reactor to when the support exits the continuous reactor.

Effects of the Invention

The method of producing zeolite films according to the present invention makes it possible to produce zeolite films continuously and efficiently because zeolite is formed in a film shape on a surface of a support by performing hydrothermal synthesis while moving the support immersed in synthetic gel in a continuous reactor.

In the second step, it is possible to use at least two pieces of preparation equipment to prepare the synthetic gel continuously.

In the fourth step, it is possible to sequentially take out the support having a zeolite film from the continuous reactor, and to clean the support continuously.

MODES FOR CARRYING OUT THE INVENTION

A zeolite film produced by the present invention is a zeolite film composed of zeolite crystals formed on the surface of a porous support. Examples of types of zeolite crystals include, for example, zeolite A, zeolite Y, zeolite NaA, zeolite T, zeolite ZSM-5, mordenite, zeolite CHA, zeolite X, and sodalite.

The porous support is not limited to any specific ones as long as the surface of the porous support has a stable porous structure on which zeolite can be crystallized in the form of a film. Preferable examples of porous supports include ceramic sintered materials composed of silica, alumina, mullite, zirconia, silicon nitride, silicon carbide, or the like; sintered metal composed of iron, stainless steel, or the like; glass; carbon molding materials, and the like. More preferable examples of porous supports include ceramic sintered materials composed of silica, alumina, mullite, and the like. The shapes of porous supports are not limited to any specific ones. Shapes such as a flat film shape, a flat plate shape, a cylindrical shape (pipe), and a columnar shape can be selected according to the purpose of use.

In the support used in the production method of the present invention, the average pore diameter is preferably 0.05 to 10 μm, and more preferably 0.1 to 4 μm. If the average pore diameter is less than 0.05 μm, the permeation rate is low, and if it is more than 10 μm, the selectivity is low, which is not preferable. In addition, in the support used in the production method of the present invention, the porosity is preferably 10 to 80%, and more preferably 40 to 80%. If the porosity is less than 10%, the permeation rate is low, and if it is more than 80%, the water-selective permeability is low, and the strength is not enough for the support, which is not preferable. Preferable porous supports are ceramic sintered materials composed of silica, alumina, mullite, or the like having a porous structure with an average pore diameter of 0.1 to 2 μm and a porosity of 30 to 50%.

Figure 1:
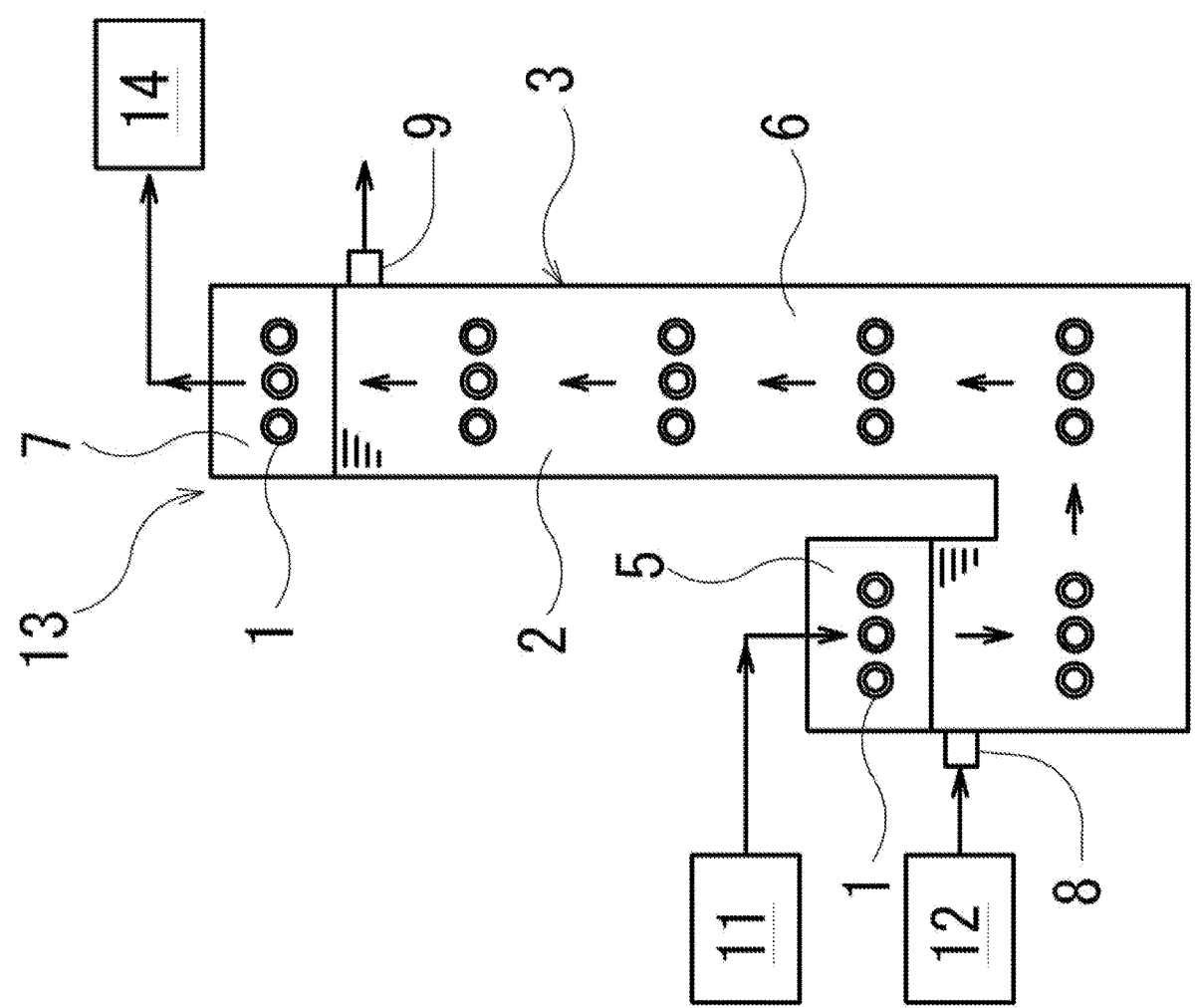
FIG. 1 is a schematic explanatory diagram illustrating an example of an embodiment of a production method according to the present invention.
Figure 2:
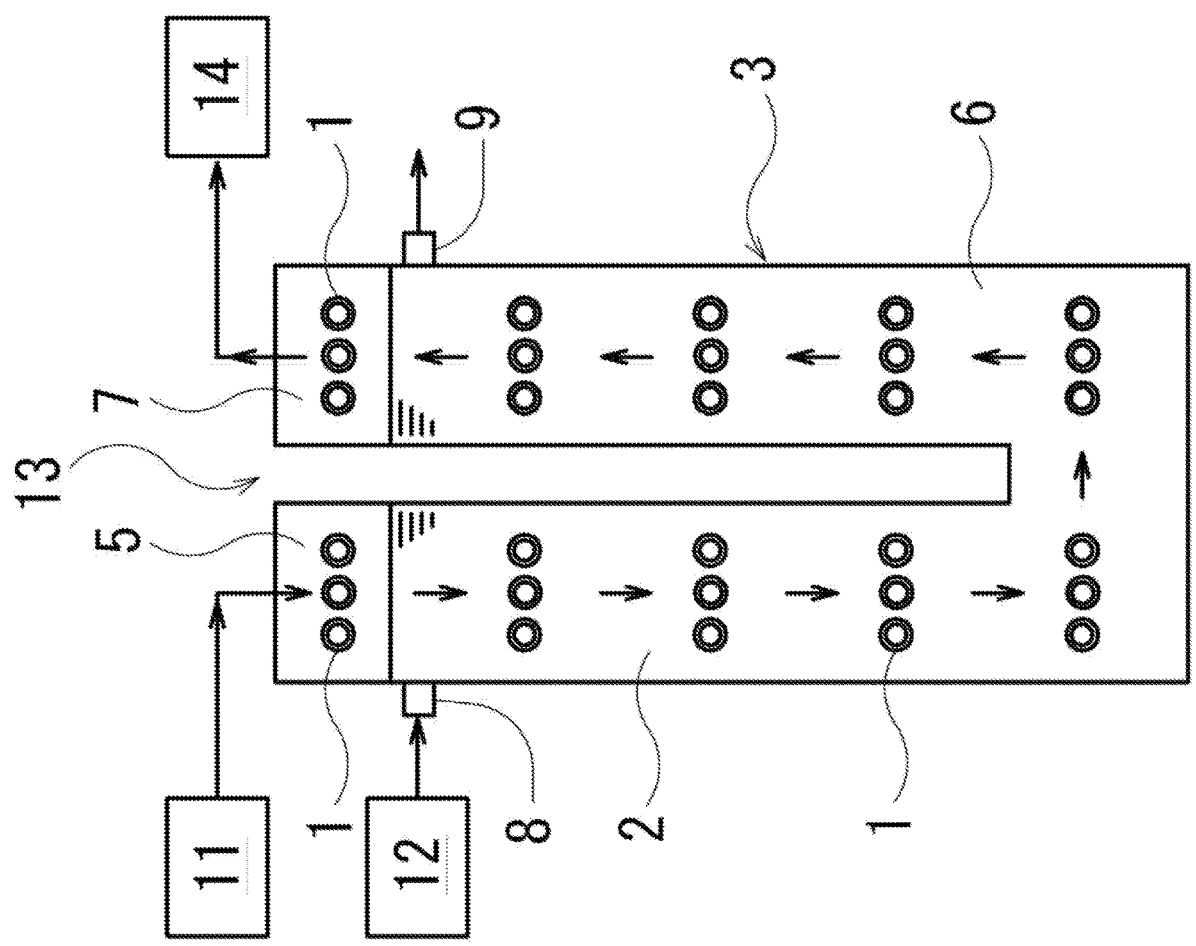
FIG. 2 is a schematic explanatory diagram illustrating another example of an embodiment of a production method according to the present invention.
Figure 3:
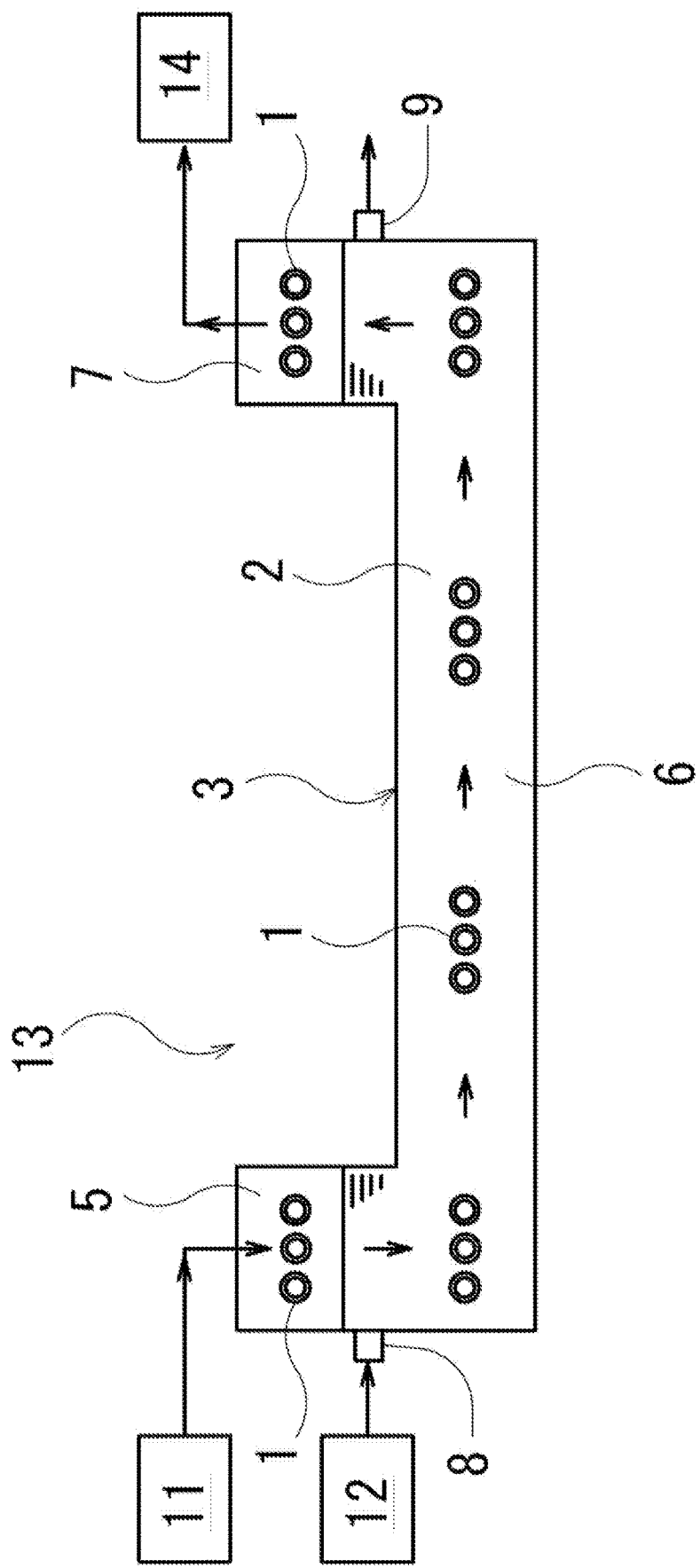
FIG. 3 is a schematic explanatory diagram illustrating still another example of an embodiment of a production method according to the present invention.

The method of producing zeolite films according to the present invention includes the following first to fourth steps:
First step: a step of attaching zeolite fine crystals to the surface of a support
Second step: a step of preparing synthetic gel for growing the fine crystals
Third step: a step of putting the synthetic gel into a continuous-reactor and performing the hydrothermal synthesis of the zeolite on the surface of the support while moving the support in the continuous-reactor
Fourth step: a step of cleaning the support on which the zeolite has been hydrothermally synthesized FIGS. 1 to 3 are diagrams schematically illustrating examples of embodiments of the method of producing zeolite films. In FIGS. 1 to 3, a support is provided to the first step 11, and zeolite fine crystals are attached to the surface of the support. The support is then provided to a front chamber 5 of a continuous reactor 3 in the third step 13. In the second step 12, synthetic gel is prepared and provided through a synthetic-gel entrance 8 into a reaction chamber 6 of the continuous reactor 3 in the third step 13. In the third step 13, the support 1 is immersed in the synthetic gel 2 put in the reaction chamber 6 of the continuous reactor 3, and hydrothermal synthesis is performed on the surface of the support 1 while the support 1 is being moved in the reaction chamber 6. After a specified hydrothermal synthesis is completed, the support 1 is moved out of the reaction chamber 6 into a back chamber 7. The support 1 moved out of the back chamber 7 is provided to the fourth step 14, where the support 1 is cleaned.

The first step is a step of applying and attaching zeolite fine crystals to the surface of the foregoing porous support on which a zeolite film is to be formed. The zeolite fine crystals are of the same kind as that of a zeolite to be produced, those having a similar crystal framework to that of a zeolite to be produced, or those that can serve as parts for the crystal framework of a zeolite to be produced. The method of attaching zeolite fine crystals is not limited to any specific ones. For example, zeolite fine crystals dispersed in a suitable solvent can be applied to the support. Alternatively, zeolite fine crystals may be attached to the support by dispersing zeolite fine crystals in a suitable solvent and immersing the support into the solvent and then pulling it up, which is generally called dip coating. Drying the support after the application increases the adhesion of the fine crystals to the support.

The second step is a step of preparing synthetic gel for growing zeolite crystals. The synthetic gel for zeolite contains components selected from an alumina source, a silica source, fluorine compounds, and water, and it may also contain a structure directing agent as necessary. As the preparation composition of the synthetic gel, the Si/Al mol ratio, F/Al mol ratio, $H_2O$/Si mol ratio, and the like may be appropriately determined depending on the type of zeolite. The structure directing agent can be added as necessary.

Note that the second step may further include aging of the prepared synthetic gel. The aging temperature is preferably the room temperature to 50° C., and more preferably 15 to 40° C. The aging time is preferably 0.5 to 24 hours, and more preferably 1 to 2 hours. The aging temperature and the aging time may be determined appropriately depending on the type of zeolite.

The synthetic gel is prepared continuously in an amount necessary in the subsequent third step by preparation equipment. The preparation equipment may be large equipment that produces a necessary amount of synthetic gel or may be multiple small pieces of equipment that produce synthetic gel continuously. The second step may be performed in parallel with the first step. The first step and the second step may be performed automatically using robots or the like without using manpower.

The third step can be performed using the continuous reactor 3. The continuous reactor 3 may include, for example, the front chamber 5, the reaction chamber 6, and the back chamber 7. The front chamber 5 is a space for putting the support 1 with zeolite fine crystals attached to its surface into the continuous reactor 3 and for holding the support 1. The front chamber 5 is capable of opening and closing to the outside of the continuous reactor 3. For example, when supports 1 are moved from the first step 11 to the front chamber 5 and held, the front chamber 5 is made open to the outside, but the boundary between the front chamber 5 and the reaction chamber 6 is closed. Thus, the internal temperature, pressure, and the like are kept in the reaction chamber 6. When the held supports 1 are moved from the front chamber 5 to the adjoining reaction chamber, the front chamber 5 can be opened and closed to the reaction chamber 6. In this case, the front chamber 5 is made closed to the outside, and the temperature, pressure, and the like of the front chamber 5 are adjusted so that the reaction chamber 6 can be opened to the front chamber 5. After that, the boundary between the front chamber 5 and the reaction chamber 6 can be opened.

The support 1 is held by suitable holding means in the front chamber 5 and moved together with this holding means or with succeeding holding means from the front chamber 5 to the reaction chamber 6, and then the support 1 is moved from the reaction chamber 6 to the back chamber 7. The holding means is not limited to specific means as long as it is movable between the front chamber 5, the reaction chamber 6, and the back chamber 7. Examples of holding means include a pallet or a net on which one or more supports 1 can be placed. In addition, examples of holding means include holding means having arms capable of holding both ends of the support. Further, if the shape of the support 1 is cylindrical, holding means may be inserted from one end or both ends of the through hole of the support 1 to hold it. Note that holding means is not shown in FIGS. 1 to 3.

The synthetic gel prepared in the second step is provided to the reaction chamber 6 through the synthetic-gel entrance 8 of the continuous reactor 3, and the temperature, pressure, and the like of the synthetic gel are adjusted for hydrothermal synthesis. The supports 1 moved from the front chamber 5 are immersed in the synthetic gel put into the reaction chamber 6, and hydrothermal synthesis is performed while the supports 1 are being moved in the reaction chamber 6. The temperature and pressure of the reaction chamber 6 are adjusted for the hydrothermal synthesis, and the reaction time is the time from when a support 1 moves from the front chamber 5 into the reaction chamber 6 to when the support 1 moves out of the reaction chamber 6 into the back chamber 7. The reaction time can be adjusted by adjusting the length of the route in which the support 1 moves in the reaction chamber 6 and the speed of the support 1.

The configuration of the continuous reactor 3 is not limited to any specific ones. For example, as illustrated in FIG. 1, the continuous reactor 1 may be of a vertical type and have the front chamber 5 and the synthetic-gel entrance 8 at its lower parts and the back chamber 7 and a synthetic-gel exit 9 at its upper parts. The hydrothermal synthesis is performed while the supports 1 are being moved inside the reaction chamber 6 from bottom to top. The specific gravity of synthetic gel decreases after it is used for hydrothermal synthesis, and thus it is easy to discharge the synthetic gel through the synthetic-gel exit 9 located at an upper part of the reaction chamber 6. Note that although in the example illustrated in the figure, the supports 1 move in groups each composed of three supports 1, the number of supports 1 in a group is not limited to any specific numbers, but it may be one or more. The distance between two consecutive groups of supports 1 may be adjusted as appropriate.

In FIG. 2, two vertical reactors having approximately the same height are connected at their bottom portions. One vertical reactor has a front chamber 5 and a synthetic-gel entrance 8 at its upper parts, and the other vertical reactor has a back chamber 7 and a synthetic-gel exit 9 at its upper parts. The hydrothermal synthesis is performed while the support 1 is moving in the reaction chamber 6 of the one vertical reactor from top to bottom and then moving in the reaction chamber 6 of the other vertical reactor from bottom to top. The embodiment in FIG. 2 makes it easy to adjust the pressure in the reaction chamber 6.

In FIG. 3, a horizontal reactor is used. One end of the horizontal reactor has a front chamber 5 and a synthetic-gel entrance 8, and the other end has a back chamber 7 and a synthetic-gel exit 9. The hydrothermal synthesis is performed while the support 1 is moving from the one end to the other end. The embodiment in FIG. 3 makes it easy to adjust the pressure in the reaction chamber 6.

The reaction chamber 6 is not limited to any specific ones as long as hydrothermal synthesis of zeolite can be performed in the chamber. A continuous reactor of a flow-through type, a simple reaction tank that is open to the atmosphere, or others also may be used. The reaction chamber has at least a synthetic-gel entrance 8 for receiving synthetic gel and a synthetic-gel exit 9 for discharging the synthetic gel used for hydrothermal synthesis. The synthetic-gel entrance 8 and the synthetic-gel exit 9 may be arranged at any positions in the reaction chamber 6. The positions can be determined in consideration of the degree of reaction of hydrothermal synthesis, the easiness of the discharge, and other factors. The reaction chamber 6 may also have, for example, means for stirring, means for adjusting temperature, means for adjusting pressure, and the like.

The supports 1 that have thin zeolite films formed on their surfaces after completing a specified hydrothermal synthesis in the reaction chamber 6 are transferred from the reaction chamber 6 to the back chamber. The back chamber 7 is a space for moving the supports 1 to the outside of the continuous reactor 3, and the back chamber 7 is capable of opening and closing to the outside of the continuous reactor 3. The back chamber 7 is also capable of opening and closing to the reaction chamber 6 adjoining the back chamber 7. For example, when the supports 1 on which hydrothermal synthesis has been completed are moved from the reaction chamber 6 to the back chamber 7, the back chamber 7 is made closed to the outside. After the temperature and pressure of the back chamber 7 is adjusted so that the reaction chamber 6 can be open to the back chamber 7, the boundary between the reaction chamber 6 and the back chamber 7 is made open so that the supports 1 can be moved. This configuration makes it possible to keep the temperature, pressure, and the like of the synthetic gel inside the reaction chamber 6. After the boundary between the reaction chamber 6 and the back chamber 7 is made closed so that the back chamber 7 can be opened, the back chamber 7 is made open to the outside, and the supports 1 are moved to the outside of the continuous reactor 3 and provided to the fourth step 14.

The fourth step is for cleaning the supports subjected to the hydrothermal synthesis. The method of cleaning the supports may be an ordinary one. The fourth step may be performed automatically using robots or the like without using manpower.

The method of producing zeolite films according to the present invention makes it possible to produce zeolite films continuously and efficiently because the thin zeolite film is formed on the surface of the support in the continuous reactor in which the supports can move.

EXPLANATION OF REFERENCE NUMERALS 1 supports
2 constant-temperature apparatus
3 continuous reactor
5 front chamber
6 reaction chamber
7 back chamber
8 synthetic-gel entrance
9 synthetic-gel exit
11 first step
12 second step
13 third step
14 fourth step

The invention claimed is:

1. A method of producing a zeolite film by forming zeolite on a surface of a support, characterized in that the method comprises the following first to fourth steps:
   a first step of attaching zeolite fine crystals to a surface of a support;
   a second step of preparing synthetic gel for growing the fine crystals;
   a third step of putting the synthetic gel into a continuous reactor and performing hydrothermal synthesis of the zeolite on the surface of the support while moving the support in the continuous reactor; and
   a fourth step of cleaning the support on which zeolite has been hydrothermally synthesized, wherein
   in the third step, the temperature, pressure, and flow of the synthetic gel in the continuous reactor is adjusted, the support is moved being immersed in the synthetic gel, the reaction time of the hydrothermal synthesis is adjusted by adjusting the time from when the support enters the continuous reactor to when the support exits the continuous reactor.

2. The method of producing a zeolite film according to claim 1, characterized in that, in the second step, at least two pieces of preparation equipment are used to prepare the synthetic gel continuously.

3. The method of producing a zeolite film according to claim 2, characterized in that, in the fourth step, the support having a zeolite film is sequentially taken out of the continuous reactor, and cleaned continuously.

4. The method of producing a zeolite film according to claim 1, characterized in that, in the fourth step, the support having a zeolite film is sequentially taken out of the continuous reactor, and cleaned continuously.

* * * * *